United States Patent
Stokes et al.

(10) Patent No.: US 9,823,151 B2
(45) Date of Patent: Nov. 21, 2017

(54) FULLY SWEPT PRESSURE SENSOR

(71) Applicant: TRL Enterprises LLC, Ashland, MA (US)

(72) Inventors: Jeffrey Stokes, Harvard, MA (US); Thomas R. Londo, Ashland, MA (US)

(73) Assignee: TRL Enterprises LLC., Ashland, MA (US)

( * ) Notice: Subject to any disclaimer, the term of this patent is extended or adjusted under 35 U.S.C. 154(b) by 101 days.

(21) Appl. No.: 14/775,908

(22) PCT Filed: Mar. 10, 2014

(86) PCT No.: PCT/US2014/022427
§ 371 (c)(1),
(2) Date: Sep. 14, 2015

(87) PCT Pub. No.: WO2014/150156
PCT Pub. Date: Sep. 25, 2014

(65) Prior Publication Data
US 2016/0033350 A1     Feb. 4, 2016

Related U.S. Application Data

(60) Provisional application No. 61/781,639, filed on Mar. 14, 2013.

(51) Int. Cl.
*G01L 19/00* (2006.01)
*G01L 7/04* (2006.01)
*G01L 19/14* (2006.01)

(52) U.S. Cl.
CPC .......... *G01L 19/14* (2013.01); *G01L 19/0023* (2013.01)

(58) Field of Classification Search
CPC ..... G01L 19/00; G01L 19/0023; G01L 19/06; G01L 19/14; G01L 7/00; G01L 7/02; G01L 7/04
See application file for complete search history.

(56) References Cited

U.S. PATENT DOCUMENTS

| | | | |
|---|---|---|---|
| 3,418,853 A | * | 12/1968 | Curtis ................. A61M 1/3639 600/488 |
| 4,610,256 A | * | 9/1986 | Wallace ............... A61B 5/0215 600/486 |
| 4,656,454 A | | 4/1987 | Rosenberger |
| 4,920,972 A | | 5/1990 | Frank et al. |

(Continued)

FOREIGN PATENT DOCUMENTS

JP     S55 93036 A     7/1980

OTHER PUBLICATIONS

International Search Report and Written Opinion for corresponding patent application No. PCT/US2014/022427 dated Jun. 24, 2014.

*Primary Examiner* — Nguyen Ha
(74) *Attorney, Agent, or Firm* — Renner, Otto, Boisselle & Sklar, LLP (57) ABSTRACT

A sensor including a flexible channel defining a fluid flow path, the flexible channel configured to at least partially deflect when a force is imparted on the flexible channel. A gel layer is in contact with an outer surface of the flexible channel, and a transducer is in contact with the gel layer. Transducer is configured to generate an output signal that corresponds to an amount of strain imparted on the flexible channel.

23 Claims, 4 Drawing Sheets

(56) References Cited

U.S. PATENT DOCUMENTS

| | | | |
|---|---|---|---|
| 5,020,377 | A | 6/1991 | Park |
| 5,042,495 | A | 8/1991 | Spotts et al. |
| 5,410,916 | A | 5/1995 | Cook |
| 5,581,038 | A | 12/1996 | Lamptopoulos et al. |
| 5,993,395 | A * | 11/1999 | Shulze ............... A61B 5/0215 600/486 |
| 6,039,078 | A * | 3/2000 | Tamari ............... A61M 1/0031 138/30 |
| 6,662,818 | B2 | 12/2003 | Paul et al. |
| 6,889,556 | B2 | 5/2005 | Steger |
| 7,225,678 | B2 | 6/2007 | Kandler et al. |
| 8,215,176 | B2 | 7/2012 | Ding et al. |
| 2003/0145886 | A1* | 8/2003 | Paul ..................... G01L 9/0001 137/98 |
| 2010/0100052 | A1 | 4/2010 | Eckhardt et al. |
| 2014/0076058 | A1* | 3/2014 | Brugger ............... G01L 9/0041 73/723 |
| 2015/0314058 | A1* | 11/2015 | O'Mahony ......... A61M 1/3639 417/63 |
| 2015/0335809 | A1* | 11/2015 | Stuva .................... A61M 1/14 137/15.01 |

* cited by examiner

FIG. 1A

Conventional Art

FIG. 1B

Conventional Art

FIG. 1C

Conventional Art

FIG. 2

Conical

FIG. 3A

Spherical

FIG. 3B

Elliptical

FULLY SWEPT PRESSURE SENSOR

RELATED APPLICATION DATA

This application claims priority of U.S. Provisional Application No. 61/781,639 filed on Mar. 14, 2013, which is incorporated herein by reference in its entirety.

TECHNICAL FIELD

The present invention relates to a pressure sensor and, more particularly, to a pressure sensor including a fluid flow cavity and corresponding sensor for measuring fluid pressure, wherein the fluid flow cavity is fully swept by fluid.

BACKGROUND

To measure pressure of a medium, such as a fluid, often a force gauge of known cross sectional area is exposed in some manner to the environment to be measured, thereby causing the force gauge to generate a signal. The generated signal, which corresponds to the actual force at the force gauge, is normalized to the sensor's active cross section, thereby providing a pressure reading.

Figure 1A:
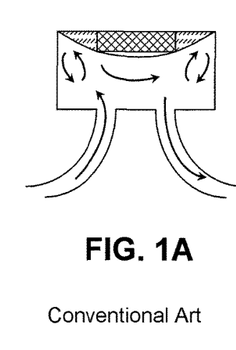
FIGS. 1A-1C are schematic diagrams illustrating conventional fluidic connections for pressure sensors.
Figure 1B:
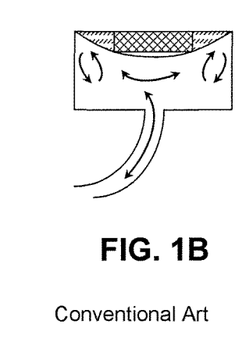
Figure 1C:
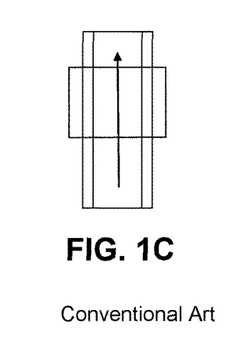

Many types and shapes of pressure sensors have been designed over the years. FIGS. 1A-1C illustrate the three most common fluidic connections for pressure sensors. FIG. 1A shows a flow-through design that includes an inlet connection, a cavity and an outlet connection. Fluid flows into the sensing cavity via the inlet connection and then out of the sensing cavity via the outlet connection. FIG. 1B illustrates a dead-head or dead-end connection, where a sensor is connected via a single connection to the sensing environment. In the dead-head configuration, the forces within the sensing environment are transferred to the sensing cavity via the open association established by the connection tube. FIG. 1C illustrates an annular flow-through design, which uses an externally mounted strain gauge that measures deflection of a tube due to pressure variation. The sensing cavity of the annular flow-through design of FIG. 1C is fully swept by fluid.

SUMMARY

The geometries of most sensing cavities in today's market are either box-shaped or cylindrical. Both of these topologies contain sharp corners, edges, eddy areas, or other non-swept areas which can lead to air entrapment and/or contamination within a given usage session or among different usage sessions. With respect to dead-head configurations, while ideally no fluid actually flows into or out of the sensing cavity of a dead-head configuration, in practice the connection tube often becomes contaminated via diffusion or leaching of the measured media. Annular flow-through designs of the type shown in FIG. 1C, while being fully swept by the fluid, require pressures inside the tube be sufficient to impart a measurable strain to the externally mounted strain gauge. Pressures below 500 PSI are typically immeasurable.

A sensor in accordance with the present invention provides a fully swept configuration, without one or more of the drawbacks associated with conventional configurations. More particularly, a sensor in accordance with the present invention includes a flexible channel (e.g., a flexible tube, a flexible wall or the like) through which fluid can flow, and a transducer arranged relative to the flexible channel. A gel is in communication with the flexible channel and the transducer, and as the flexible channel expands or contracts due to changes in pressure, the expansion and contraction is communicated to the transducer via the gel.

According to one aspect of the invention, a sensor includes: a flexible channel defining a fluid flow path, the flexible channel configured to at least partially deflect when a force is imparted on the flexible channel; a gel in contact with an outer surface of the flexible channel; and a transducer in contact with the gel, wherein the transducer is configured to generate an output signal that corresponds to an amount of strain imparted on the flexible channel.

According to one aspect of the invention, the fluid flow path is fully swept by a fluid passing through the flexible channel.

According to one aspect of the invention, the sensor's entire fluid flow path is fully swept by a fluid passing through the flow path of the sensor.

According to one aspect of the invention, the flexible channel includes a thin-walled structure formed from one or more of polytetrafluoroethylene elastomers, FEP, aluminum, steel, or the like. According to one aspect of the invention, the output signal of the transducer corresponds to a force imparted on the gel.

According to one aspect of the invention, one or more fluidic connections associated with an inner aspect of the flexible channel form smooth transitions from the fluidic connections to the inner aspect of the flexible channel.

According to one aspect of the invention, the gel includes an adhesive gel.

According to one aspect of the invention, the gel comprises a non-adhesive gel.

According to one aspect of the invention, the gel includes a non-compressible gel.

According to one aspect of the invention, a rigid channel in fluid communication with the flexible channel, wherein a geometry of the rigid channel adjacent to the flexible channel transitions from a first geometry to a second geometry, the second geometry corresponding to a geometry of the flexible channel.

According to one aspect of the invention, the transition of the rigid channel includes at least one of a spherical shape, a conical shape, an elliptical shape, or any other geometric shape conferring a smooth transition from the rigid channel to the flexible channel.

According to one aspect of the invention, the transition of the rigid channel includes a non-gaping, smooth face seal of any kind including from a flared terminus of the rigid channel, to a flared terminus of the flexible channel, or any combination of each on either the inlet or outlet side or both.

According to one aspect of the invention, wherein the fluid flow path further comprises a rigid channel formed unitary with the flexible channel, the fluid flow path having smooth transitions throughout the fluid flow path.

According to one aspect of the invention, the sensor includes a housing with a first housing part having a first cavity and a second housing part having a second cavity, the second housing part detachably coupled to the first housing part, wherein the transducer and the flexible channel are arranged in a chamber defined by the combination of the first cavity and the second cavity.

According to one aspect of the invention, the transducer is arranged in the first cavity, and the gel is in contact with at least a sensing surface of the transducer.

According to one aspect of the invention, the sensor includes a membrane spanning an open side of the first cavity to isolate the gel and transducer within the first cavity.

According to one aspect of the invention, the flexible channel is arranged in the second cavity, and the gel is formed around the flexible channel.

According to one aspect of the invention, the sensor includes a membrane spanning an open side of the second cavity to isolate the gel and the flexible channel within the second cavity.

According to one aspect of the invention, the sensor includes a plurality of features formed in a surface of at least one of the first cavity, second cavity, transducer or flexible channel, wherein the gel is formed around the features to secure the gel to the surface.

According to one aspect of the invention, the sensor includes an amplifier, such as a mechanical force amplifier, configured to alter a force transferred between the flexible channel and the transducer.

According to one aspect of the invention, the amplifier is arranged between the transducer and the flexible channel.

According to one aspect of the invention, the amplifier is removably insertable within the sensor.

According to one aspect of the invention, the amplifier includes: first and second external surfaces generally parallel to each other, the first and second external surfaces including recesses formed therein; and a gel arranged within the first and second recesses.

According to one aspect of the invention, the sensor includes: a housing, wherein the flexible channel and transducer are arranged within the housing; a recess arranged in the housing; a retaining member for securing a rigid channel to the housing; and a gel arranged between the retaining member and the recess.

According to one aspect of the invention, the retaining member includes a ferrule.

According to one aspect of the invention, the sensor includes a housing, wherein at least one of the flexible channel or the transducer is removably insertable within the housing.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Embodiments of this invention will now be described in further detail with reference to the accompanying drawings, in which.

DETAILED DESCRIPTION OF EMBODIMENTS

For purposes of this disclosure the term "fluidic" means a continuous, amorphous substance whose molecules move freely past one another and that has the tendency to assume the shape of its container. A fluid may be a liquid or a gas. The terms "fitting" and "connector" and "coupler" may be used interchangeably and generally refer to coupling with a device and/or a component, for example.

Aspects of the present invention relate to a fully-swept pressure sensor. In this sense fully-swept refers to a flow chamber with a geometry such that, once primed, all inner aspects of the chamber are contacted by the flowing media at all times. Preferably, the flow chamber is fashioned in such a way that the flowing media's streamlines are smoothly continuous from the inlet port to the outlet port with no singularities or disruptions. Generally this implies that there are no nooks, crannies, dead legs, sharp corners, or eddy sections within the flow path to entrain the flowing media. Features such as those often lead to highly undesirable carryover and/or cross-contamination from residual material as the media's composition changes.

Figure 2:
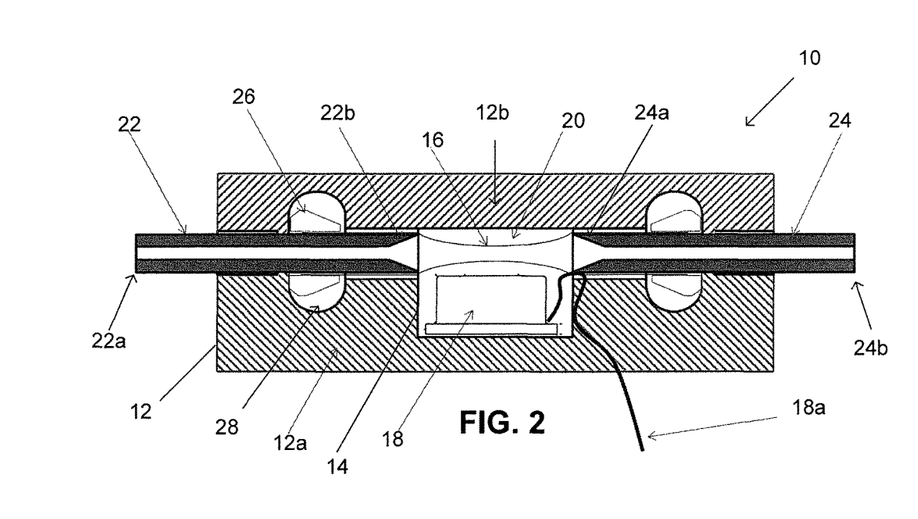
FIG. 2 is a sectional view of an exemplary sensor in accordance with aspects of the present invention.

Referring to FIG. 2, a cross-section of an exemplary sensor 10 in accordance with aspects of the present invention is illustrated. The sensor 10 includes a housing 12 having a sensing chamber 14 formed therein. The housing 12 may be formed as a two-piece assembly having a first housing part 12a and a second housing part 12b removably attached to the first housing part 12a. A flexible channel 16 defining a fluid flow path is arranged in the sensing chamber 14. As used herein, the term "flexible channel" is defined as a channel, passage or the like that is capable of expanding or contracting in response to a fluid under pressure or vacuum within the channel. The flexible channel 16 may be formed from a tubular structure or the like that has been partially collapsed, puckered, fluted, scalloped, accordioned, or otherwise deformed or shaped such that a net pressure differential normal to the tube walls will deform a resting shape of the walls and cause an overall volume change. Preferably, an inner wall of the flexible channel exhibits a convex shape. Although a straight flow channel is shown, the inner flow path defined by the flexible channel 16 can be of any convenient shape. Exemplary shapes include a straight channel, a U-shape channel, an L-shape channel, a spiral channel and a serpentine channel. The different inner flow shapes can be useful for allowing inlets and outlets of the sensor 10 to be formed on any desired aspect of the device.

A transducer 18 is arranged relative to the flexible channel 16, and a non-compressible gel 20 is in contact with an outer surface of the flexible channel 16 and with at least a sensing surface of the transducer 18. Connector 18a provides signals generated by the transducer 18 to external measuring equipment (not shown). The transducer 18 and the flexible channel 16 may be removably insertable within the housing. A removably insertable transducer and/or flexible channel is advantageous in that it enables the transducer to be easily reconfigured or sterilized without having to decouple the housing 12 from the system being monitored.

First and second rigid-wall tubes 22 and 24 (also referred to as rigid channels 22 and 24) are coupled to the flexible channel to enable fluid to enter and exit the flexible channel 16. As used herein, the term "rigid channel" is defined as a channel, passage or the like that, up to at least a maximum pressure rating and/or maximum vacuum rating of the sensor, substantially maintains its geometry in response to a fluid or vacuum within the channel. The phrase "substantially maintains its geometry" is defined as a geometry variation of 0.5 percent or less at the maximum pressure rating or maximum vacuum rating of the sensor. The rigid-wall tube may be inserted into a lumen of the flexible channel and/or a connector may couple the rigid wall tube and the flexible channel. More specifically, a first end 22a of the first rigid-wall tube 22 provides an inlet to the sensor 10, and a second end 22b of the first rigid-wall tube 22 provides fluid to the flexible channel 16. A first end 24a of the second rigid-wall tube receives fluid from the flexible chamber 16, and a second end 24b of the second rigid-wall tube provides an outlet of the sensor 10.

An end geometry of the rigid-wall tubes preferably forms a smooth, non-disjoint, monotonic transition from an inner diameter of the rigid-wall tube 22, 24 to the inner diameter of the flexible channel 16. For example, a geometry of the ends 22b and 24a of the respective rigid-wall tubes 22 and 24 smoothly transitions from a first geometry to a second geometry that corresponds to a geometry of the flexible channel 16. In addition, bevels or the like may be included at junctions between the rigid-wall tubes 22, 24 and the flexible channel 16. The smooth transitions and bevels minimize flow disturbances in the fluid, which provides fully swept flow and eliminates contamination of the entire flow path's lumen.

Figure 3A:
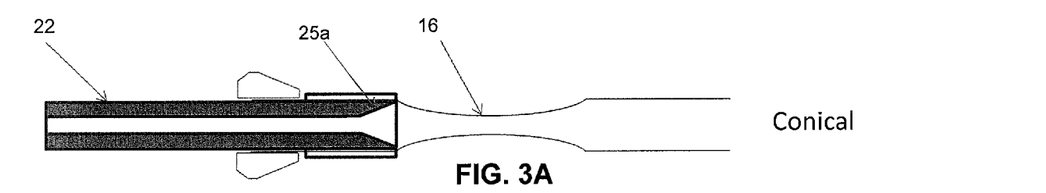
FIGS. 3A-3C are sectional views of exemplary flow paths through a sensor in accordance with aspects of the present invention.
Figure 3B:
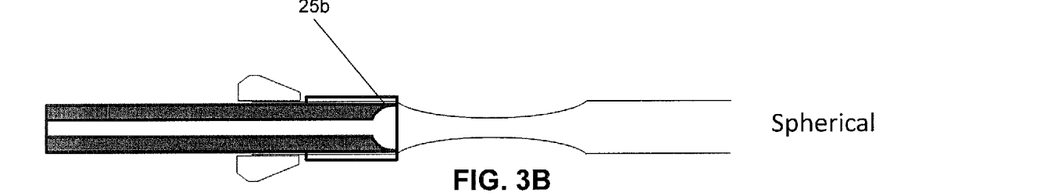
Figure 3C:
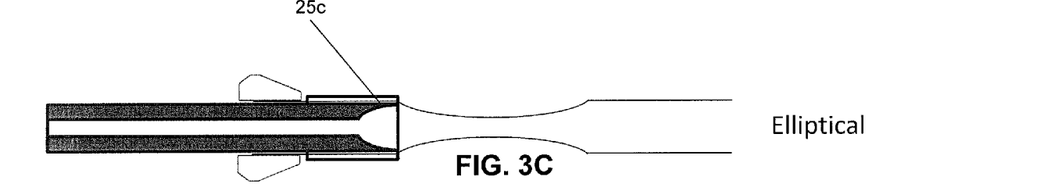

The transition geometry can be of any shape that effects a smooth conversion across the wall of the inner tubing. Referring briefly to FIGS. 3A-3C, exemplary geometries that may be employed in the rigid-wall tubes 22 and 24 are shown. FIG. 3A illustrates a conical geometry 25a, FIG. 3B illustrates a spherical geometry 25b and FIG. 3C illustrates an elliptical geometry 25c. Although not shown, other possible geometries include concave, parabolic, or hyper parabolic geometries.

Referring back to FIG. 2, the rigid-walled tubes 22 and 24 may be firmly affixed via conventional means to the flexible channel 16 to prevent leakage and axial slippage between the rigid-walled tubes 22 and 24 and the flexible channel 16. For example, an exemplary retaining member 26, such as a ferrule or the like is shown. The ferrule 26 may be coupled to each tube 22 and 24, and a cavity 28 can be formed in the housing 12 to cooperate with the ferrule 26. The ferrule 26 and cavity 28 operate to counteract forces that tend to urge the rigid-wall tube out of the housing 12.

While a retaining member in the form of a ferrule is shown in the exemplary embodiment, it should be appreciated that other means for maintaining the rigid-wall tube 22, 24 in the housing 12 can be implemented. For example, face seals, O-rings, welding, or any other conventional sealing mechanism, such as swaged, quarter turn, radial seal, adhesive, weld, etc. may be employed. Alternatively, the rigid-wall tubes 22 and 24 may be pressed-fit into the housing 12, or may include threaded ends that cooperate with a corresponding threaded receiver in the housing 12. In one embodiment, a semicircular protrusion is formed in the first housing part 12a so as to protrude into the region occupied by the tubes 22 and 24 29. A corresponding semicircular protrusion is formed in the second housing part 12b. As the first and second housing parts are assembled to one another, the semicircular protrusions contact the outer walls of the tubes 22 and 24 to form a seal therebetween.

Figure 4:
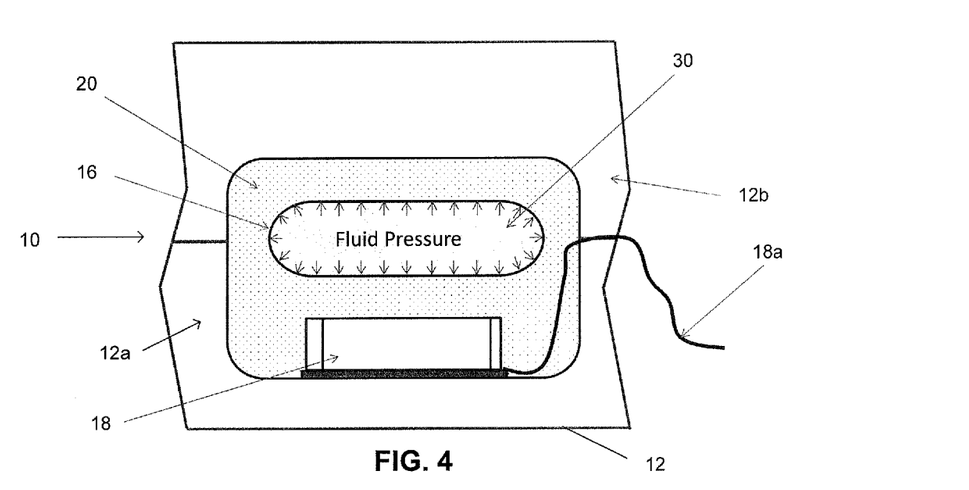
FIG. 4 is a sectional view of the exemplary sensor in accordance with aspects of the present invention.

With additional reference to FIG. 4, as fluid 30 flows through the sensor 10 the entire fluid flow path 22 to 16 to 24 (the flow path defined by the rigid channels in combination with the flexible channel) is fully swept by the fluid 30. In contrast to conventional pressure sensors, there are no nooks, crannies, dead legs, sharp corners, or eddy sections within the flow path to entrain the flowing media, which often leads to carryover and/or cross-contamination from residual material as the media's composition changes temporally within a sensing session or among different sensing sessions. Additionally, the fully swept character of the entire fluidic path greatly reduces the probability of entraining air bubbles within the pressure sensing cavity. Entrapped air, especially varying amounts of entrapped air, throughout multiple uses can cause delays in pressure response which in turn could lead to inaccurate and imprecise measurements by the sensor depending on the required read rates of the pressure data. Eliminating entrapped air confers the benefit of much more stable and accurate pressure readings within a session, from session to session, and from device to device. Further, the fully swept flow path requires less time to prime the sensor, as there is no place for air or other gases to be trapped within the fluid flow path. This is advantageous in that reduction in time minimizes costs associated with priming the sensor. Also, reducing the time required to prime the sensor results in less fluid and less fluid waste (and thus a further reduction in cost).

As fluid flows through the flexible channel 16, fluid pressure acts on the inner surface of the flexible channel 16 and tends to expand the channel, as indicated by the arrows normal to the inner surface of the flexible channel 16. The flexible channel 16 is configured to at least partially deflect (expand or contract) when a force is imparted on the flexible channel and in the pressurized example shown in FIG. 4 the flexible channel 16 expands. The expansion (or contraction) of the flexible channel 16 is communicated to the gel 20, which communicates the expansion (or contraction) to the transducer 18. In response, the transducer 18 generates an output signal that corresponds to an amount of strain imparted on the flexible channel 16 as communicated through the gel 20. In other words, the output signal of the transducer 18 corresponds to a force imparted on the gel 20 by the flexible channel 16.

The specific materials that form the components of the sensor 10 depend on the application of the sensor 10 as well as the material that will be monitored. For example, the material forming a boundary of the sensing chamber 14 must be able to withstand at least the total force imparted to the gel 20 for the maximum pressure rating of the sensor without perceptible deformation or deflection of the sensor housing 12. With respect to the flexible channel 16, the material forming the flexible channel 16 can be selected to strike a balance between compatibility with the flowing media as well as providing the potential to be deformed within the desired pressure window. In one embodiment the flexible channel 16 is formed as a thin-walled flexible tubing material, and in another embodiment the thin-wall flexible tubing is formed from polytetrafluoroethylene (Teflon®). In another embodiment the flexible channel 16 is formed from steel (e.g., stainless steel) or the like. In yet another embodiment, the flexible channel 16 is partially formed in one of the first housing part 12 or second housing part 12b. More specifically, the first housing part 12a may have formed therein a smooth, rigid cavity. A membrane or other flexible device may be arranged in the second housing part 12b over the transducer 18, with the gel 20 being arranged in the sensing chamber 14 between the membrane and the transducer 18. The smooth, rigid cavity and membrane are arranged such that as the first housing part 12a is attached to the second housing part 12b a flow channel is defined in the sensor 10 that is in fluid communication with the tubes 22 and 24. As fluid flows through the sensor 10, fluid pressure will be communicated to the transducer 18 via the flexible membrane and gel 20.

The sensing range of the sensor may be modified by altering the deformation/restoration properties of the flexible channel 16. Very "flimsy" material transfers very small applied forces to the gel 20, thereby providing low-detection limit sensing. Intensively "firm" material resists the tendency to deform or restore until the applied forces reach a threshold at which point the tube's luminal forces transfer to the gel 20. This tends to shift the initial reaction to the pressure of the flowing media and effectively offsets the sensing range of the sensor toward higher pressure ranges.

The gel 20 preferably is a two-part gel, where both parts are initially in liquid form. After mixing the two parts together, the mixed solution transitions from a liquid to a gel. The time period in which the mixed parts transition to a gel 20 can be selected based on the needs of sensor manufacturing process. In one embodiment, the gel 20 is a non-adhesive gel. In another embodiment, the gel 20 exhibits adhesive properties such that the gel 20 can bond parts of the sensor to each other. In this regard, it is preferable that the adhesive properties of the gel 20 are not permanent, i.e., the bond can be broken without damaging other parts of the sensor 10. A gel 20 having adhesive properties is advantageous in that it enables the sensor 10 to operate not only as a pressure sensor, but also enhances operation as a vacuum sensor. For example, in the presence of a vacuum the flexible channel 16 contracts. Since the gel 20 is bonded to an outer surface of the flexible channel 16, as the channel 16 contracts it immediately pulls the gel in the direction of the contraction. Since the gel is also bonded to the sensing surface of the transducer 18, the pull by the flexible channel 16 on the gel 20 is transferred to the transducer 18. While it is preferable to use an adhesive gel when operating the sensor under a vacuum, a non-adhesive gel could be used provided the area within the sensing chamber is completely sealed such that outside air cannot enter the chamber while under vacuum.

Figure 5:
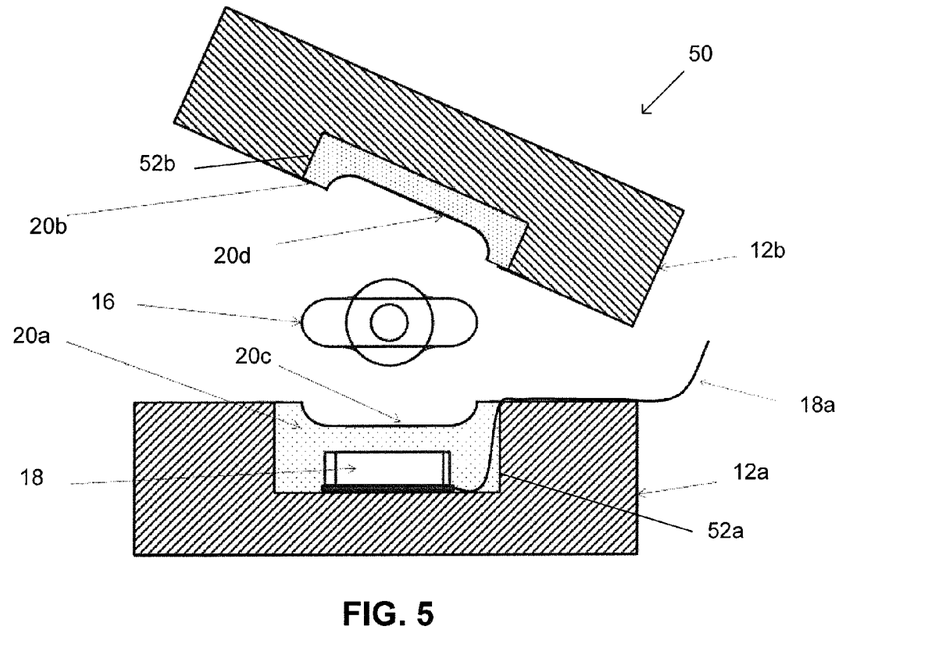
FIG. 5 is a sectional view of another exemplary sensor in accordance with aspects of the present invention.

Moving now to FIG. 5, another embodiment of a sensor in accordance with the present invention is illustrated. The sensor 50 of FIG. 5 is similar to the sensor 10 of FIGS. 2 and 4, and includes a two-part housing 12 having a first housing part 12a and a second housing part 12b removably attached to the first part 12a. A cavity 52a (also referred to as a recess) is formed in the first housing part 12a and a cavity 52b is formed in the second housing part 12b. When the housing parts 12a and 12b are assembled the respective cavities 52a and 52b define the sensing chamber 14. A flexible channel 16 and a transducer 18 are arranged within the sensing chamber 14, and a gel 20 is formed around at least a portion of the flexible channel 16 and the transducer 18. Cable 18a provides signals from the transducer 18 to external measurement equipment (not shown).

The gel 20 formed in the sensor 50 includes two parts. A first gel part 20a is formed in the cavity 52a of the first housing part 12a so as to cover at least a sensing surface of the transducer 18, and a second gel part 20b is formed in the cavity 52b of the second housing part 12b. Further, a contour 20c and 20d of the first and second gel parts 20a and 20b is formed so as to correspond to a contour of the flexible channel 16. To assemble the sensor 50, the flexible channel 16 is placed in the gel part 20a of the first housing part 12a, and the second housing part 12b, which includes the second gel part 20b, is placed over the flexible channel 16.

The sensor 50 of FIG. 5 is advantageous in that it enables quick replacement of the flexible channel 16. For example, due to different physical properties and chemical reactivities of the flowing media, flexible channels 16 formed from different materials can be readily substituted as needed. Also, flexible channels 16 formed from various materials can be swapped in and out of the sensor to adjust the sensing range and sensitivity of the sensor (e.g., by replacing a thin-wall tube formed from Teflon® with a thin-wall tube formed from stainless steel, the sensitivity of the sensor 50 is altered). Maintenance may be another reason to remove and/or replace the flexible channel 16, e.g., to remove contaminants from the sensor. In this regard, the entire flow path contacting the flowing media can be removed for sterilization. It also may be desirable to replace the flexible channel 16 between measurements of different batches of material so as to eliminate any carry-over or cross-over contamination. This is important in bio-medical, bio-pharmaceutical, and bio-analytical applications as well as industrial chemical applications such as fine doping and refining processes.

To remove and/or replace the flexible channel, the second housing part 12b can be detached from the first housing part 12a and the flexible channel 16 then can simply be detached from the gel 20a and 20b. To reassemble the sensor, the different or cleaned flexible channel 16 is simply inserted into to the gel 20a or 20b of the first or second housing parts 12a or 12b, and the second housing part 12b is attached to the first housing part 12a.

The embodiments of FIGS. 2, 4 and 5 each include a sensing chamber 14 that has a relatively smooth surface. While such smooth surface may be advantageous for certain applications, e.g., if it is desirable to remove the gel 20 from the sensing chamber 14, in other applications it may be advantageous to enhance the grip or bond strength between the gel 20 and a surface of the sensing chamber 14.

Figure 6:
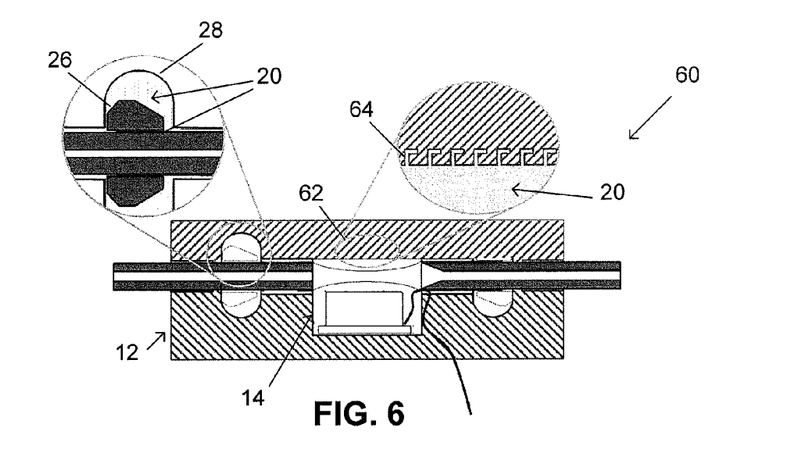
FIG. 6 is a sectional view of another exemplary sensor in accordance with aspects of the invention.

Referring to FIG. 6, an exemplary sensor 60 is shown that includes a means for enhancing the bond between the gel 20 and a surface of the sensing chamber 14. More particularly, one or more surfaces 62 within the sensing chamber 14 include features 64 that provide an area in which the gel 20 can "bite" into. For example, the features 64 could be a plurality of L-shape cavities formed in the surface of the sensing chamber 14. When the gel 20, which initially is in liquid form, is placed in the sensing chamber 14 the liquid flows into the features 64. Once the gel 20 transitions from a liquid state to a gel state, the gel 20 is formed in the cavities thereby securing the gel 20 to the surface 62.

While L-shape features are shown in FIG. 6, other features could also be implemented. For example, the features 64 could take the form of indentations, protrusions, grooves, ridges, or any other geometry that enhances grip between the gel and the surface. Further, a combination of such features may be formed on one or more surfaces. Also, while the features 64 are shown formed on a surface 62 of the sensing chamber 14, features also could be formed on an outer surface of the flexible channel 16 and/or on a sensing surface of the transducer 18. Forming features on the flexible channel 16 and/or transducer may be advantageous, for example, when the sensor is used to measure vacuum, e.g., where the flexible channel 16 contracts during a measurement cycle. In such use, the features 64 enhance the bond between the gel 20 and a surface of the flexible channel 16 and/or a surface of the transducer 18, thereby ensuring that a contraction of the flexible channel 16 is accurately communicated to the transducer 18.

FIG. 6 also illustrates another feature of the sensor in accordance with the present invention. More specifically, and as discussed above, the sensor can include a retaining member 26, such as a ferrule or the like, to retain the rigid-wall tubes 22 and 24 in the housing 12 and to provide a seal that prevents fluid from leaking out of the sensor. Conventionally, a machined surface between an inner surface of the ferrule 26 and an outer surface of the rigid-wall tubes 22 and 24 as well as the machined surface of an outer surface of the ferrule 26 and the cavity 28 of the housing 12 requires specific tolerances in order to provide satisfactory sealing and retention of the rigid-wall tubes in the housing 12. Such precision machining can add cost to the sensor. In accordance with an embodiment of the present invention, the gel 20, while still in liquid form, can be deposited in a space between the inner surface of the retaining member 26, e.g., the ferrule, and the outer surface of the rigid-wall tubes 22 and 24, as well as between the outer surface of the retaining member 26 and the cavity 28. As the gel firms up, it seals the respective areas and prevents fluid leakage from the sensor. Further, since the gel is non-compressible, as the gel between the retaining member 26 and the cavity 28 and between the retaining member 26 and the rigid-wall tubes 22 and 24 firms up, relative movement of the retaining member 26, housing 12 and rigid-wall tubes 24 and 26 is inhibited. This is advantageous in that it allows machining tolerances to be increased, which can reduce the cost to manufacture the sensor.

Figure 7:
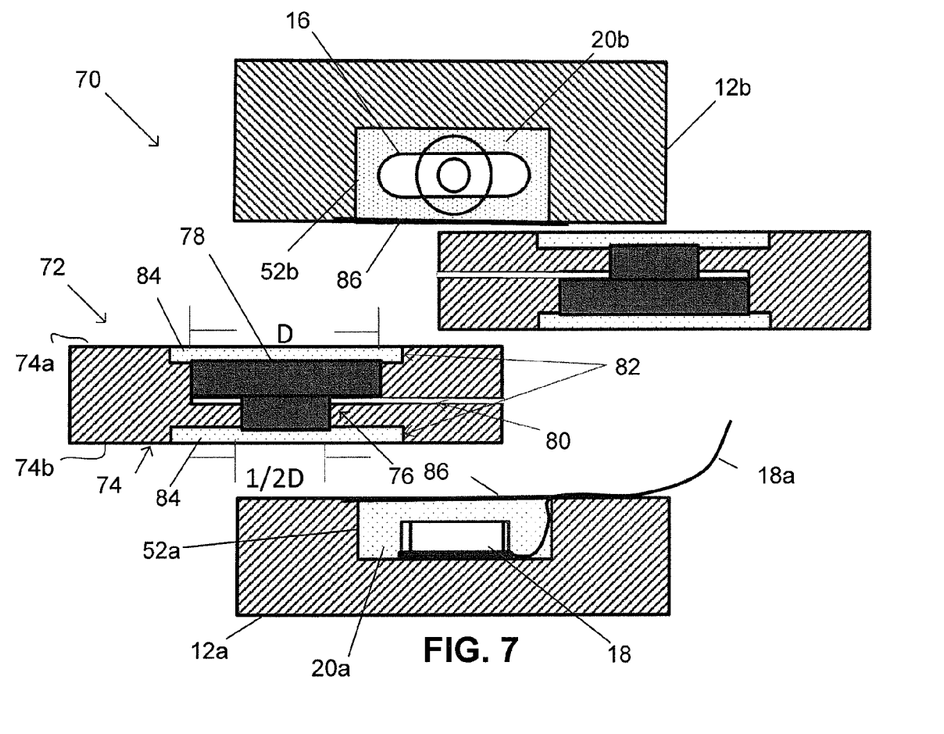
FIG. 7 is a sectional view of another exemplary sensor in accordance with aspects of the present invention.

Referring now to FIG. 7, another embodiment of a sensor in accordance with the present invention is illustrated. The sensor 70 of FIG. 7 is similar to the sensor of FIG. 5, and includes a two-part housing having a first part 12a and a second part 12b removably attached to the first part 12a. A cavity 52a and 52b (also referred to as a recess) is formed in the first and second housing parts 12a and 12b, respectively, and when the housing parts are assembled the respective cavities 52a and 52b define a sensing chamber. A transducer 18 is arranged in the cavity 52a of the first housing part 12a, and a flexible channel 16 is arranged in the cavity 52b of the second housing part 12b. Gel 20a and 20b then is formed in the respective cavities 52a and 52b so as to "pot" the transducer 18 and the flexible channel 16 in cavities of the respective housing parts 12a and 12b. In this situation, the two halves of the sensing chamber can be disassembled and a new or different fluidic half can be assembled to the transducer half conferring all the same benefits as those described for replacing or swapping out flexible channels in FIG. 5. The configuration shown in FIG. 7, however, has the added advantage that the fluid path is not disturbed during swapping or replacement. A cable 18a provides signals from the transducer 28 to external measurement equipment (not shown).

Optionally arranged between the first and second housing parts 12a and 12b is an amplifier 72, which alters a force transferred between the flexible channel 16 and the transducer 18. In the embodiment shown in FIG. 7, the amplifier is shown in two different orientations (in practice, the amplifier may be used on one of the two orientations). In a first orientation (lower illustration), the amplifier 72 acts to increase a pressure signal generated by the flexible channel 16, and in a second orientation (upper illustration) the amplifier acts to decrease a pressure signal generated by the flexible channel 16.

The amplifier 72 includes a housing 74 having first and second external surfaces 74a and 74b that are generally parallel to each other, a bore 76 formed within the housing 74, and a piston 78 arranged within and movable relative to the bore 76. The piston and bore are preferably configured as a slip fit, i.e., loose enough to move freely but tight enough not to allow extrusion of the gel between the piston and bore. The bore 76 and piston 78 are formed having a first (large) diameter and a second (small) diameter. In the embodiment shown, the first diameter is twice that of the second diameter, although other arrangements can be implemented depending on the requirements of the specific application. A vent 80 couples the bore 76 to the external environment to prevent pressure build up within the amplifier 72 and affecting the measured pressures. Formed within the housing 72 adjacent to each end of the piston 78 is a recess 82, and gel 84 is formed within the respective recesses.

The piston 78 of the amplifier is arranged to cooperate with the flexible channel 16 and transducer 18 such that as a force generated by the flexible channel 16 is communicated to the transducer 18 via the piston 28. For example, as the flexible channel 16 expands due to a pressure increase, the force is communicated to one end of the piston 78 via the gel between the flexible channel 16 and one end of the piston 78. The piston then communicates the force to the transducer 18 via the gel between the other end of the piston and the transducer 18. The ratio between the large piston diameter and the small piston diameter dictates the gain of the amplifier 72.

To prevent the gel 84 in the recess 82 from bonding to the gel 20a and 20b in the cavities 52a and 52b of the housing parts 12a and 12b, an isolation device 86 can be used. In one embodiment, an isolation device in the form of a membrane or the like is arranged over the gel 20b of the second housing part 12b so as to span an open side of the second cavity 52b and isolate the flexible channel 16 and surrounding gel 20b within the cavity 52b. In another embodiment, a membrane or the like is also arranged over the gel 20a of the first housing part 12a so as to span an open side of the first cavity and isolate the transducer 18 and surrounding gel 20a within the cavity 52a. Since the membrane isolates one gel part from the other, the different gel parts cannot bond to one another. This enables the sensor to be easily disassembled without damaging the gel parts.

While the amplifier 72 is shown as a separate part sandwiched between the first and second housing parts 12a and 12b, the amplifier 72 could be formed integral with the first or second housing part 12a and 12b. Such integral design simplifies the assembly process, but loses the flexibility of being able to remove the amplifier 72 from the sensor 70. Further, the sensor and amplifier may be configured such that the amplifier is removably insertable within the sensor. In this manner, amplifiers can be added, swapped, or removed based on the needs of the application.

In another embodiment in accordance with the present invention, a media flow path portion of the flexible channel and/or rigid channel could form part of a manifold. In this regard, the manifold could be a comprehensive, monolithic, fluidic network handling the entire or portions of the overall flow needs of a system. Alternatively, the manifold could be a discrete, connectable module handling the pressure sensor's flow requirements only with the module designed for assembly with other flow components to form a higher level flow manifold.

In one embodiment, the flexible channel and/or transducer of the sensor may be rigidly affixed to a host system or subsystem with the fluid manifold forming a replaceable fluid path that attaches to and detaches from the sensors on the system. Alternatively, the fluid manifold could form a fixed fluidic network "permanently" placed in a fluidic environment under investigation with the sensing portion being connected only during measurement periods.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A sensor comprising:
   a flexible channel defining a fluid flow path, the flexible channel configured to at least partially deflect when a force is imparted on the flexible channel;
   a rigid channel in fluid communication with the flexible channel, wherein an interface between the flexible channel and the rigid channel forms a smooth transition that causes the fluid to fully sweep the fluid flow path such that all inner aspects of the fluid flow path are contacted by the fluid at all times;
   a gel in contact with an outer surface of the flexible channel;
   a transducer in contact with the gel, wherein the transducer is configured to generate an output signal that corresponds to an amount of strain imparted on the flexible channel; and
   a housing including a first housing part having a first cavity and a second housing part having a second cavity, the second housing part detachably coupled to the first housing part, wherein the transducer and the flexible channel are arranged in a chamber defined by the combination of the first cavity and the second cavity.

2. The sensor according to claim 1, wherein the sensor's entire fluid flow path is fully swept by a fluid passing through the flow path of the sensor.

3. The sensor according to claim 1, wherein the flexible channel comprises a thin-walled structure formed from at least one of polytetrafluoroethylene, elastomers, FEP, aluminum, or steel.

4. The sensor of claim 1, wherein the output signal of the transducer corresponds to a force imparted on the gel.

5. The sensor according to claim 1, wherein the gel comprises a non-adhesive gel.

6. The sensor according to claim 1, wherein the gel comprises a non-compressible gel.

7. The sensor according to claim 1, wherein a geometry of the rigid channel adjacent to the flexible channel transitions from a first geometry to a second geometry, the second geometry corresponding to a geometry of the flexible channel.

8. The sensor according to claim 7, wherein the transition of the rigid channel comprises at least one of a spherical shape, a conical shape or an elliptical shape.

9. The sensor according to claim 1, wherein the fluid flow path further comprises a rigid channel formed unitary with the flexible channel, the fluid flow path having smooth transitions throughout the fluid flow path.

10. The sensor according to claim 1, wherein the transducer is arranged in the first cavity and the gel is in contact with at least a sensing surface of the transducer.

11. The sensor according to claim 10, further comprising a membrane spanning an open side of the first cavity to isolate the gel and transducer within the first cavity.

12. The sensor according to claim 1, wherein the flexible channel is arranged in the second cavity and the gel is formed around the flexible channel.

13. The sensor according to claim 12, further comprising a membrane spanning an open side of the second cavity to isolate the gel and the flexible channel within the second cavity.

14. The sensor according to claim 1, further comprising a plurality of features formed in a surface of at least one of the first cavity, second cavity, transducer or flexible channel, wherein the gel is formed around the features to secure the gel to the surface.

15. The sensor according to claim 1, further comprising a housing, wherein at least one of the flexible channel or the transducer is removably insertable within the housing.

16. A sensor comprising:
   a flexible channel defining a fluid flow path, the flexible channel configured to at least partially deflect when a force is imparted on the flexible channel;
   a gel in contact with an outer surface of the flexible channel; and
   a transducer in contact with the gel, wherein the transducer is configured to generate an output signal that corresponds to an amount of strain imparted on the flexible channel, wherein an inner wall of the flexible channel comprises a convex shape.

17. A sensor comprising:
   a flexible channel defining a fluid flow path, the flexible channel configured to at least partially deflect when a force is imparted on the flexible channel;
   a gel in contact with an outer surface of the flexible channel; and
   a transducer in contact with the gel, wherein the transducer is configured to generate an output signal that corresponds to an amount of strain imparted on the flexible channel, wherein the gel comprises an adhesive gel.

18. A sensor comprising:
   a flexible channel defining a fluid flow path, the flexible channel configured to at least partially deflect when a force is imparted on the flexible channel;
   a rigid channel in fluid communication with the flexible channel, wherein an interface between the flexible channel and the rigid channel forms a smooth transition that causes the fluid to fully sweep the fluid flow path such that all inner aspects of the fluid flow path are contacted by the fluid at all times;
   a gel in contact with an outer surface of the flexible channel;
   a transducer in contact with the gel, wherein the transducer is configured to generate an output signal that corresponds to an amount of strain imparted on the flexible channel; and
   an amplifier configured to alter a force transferred between the flexible channel and the transducer.

19. The sensor according to claim 18, wherein the amplifier is arranged between the transducer and the flexible channel.

20. The sensor according to claim 18, wherein the amplifier is removably insertable within the sensor.

21. The sensor according to claim 18, wherein the amplifier comprises:
   first and second external surfaces generally parallel to each other, the first and second external surfaces including recesses formed therein; and
   a gel arranged within the first and second recesses.

22. A sensor comprising:
- a flexible channel defining a fluid flow path, the flexible channel configured to at least partially deflect when a force is imparted on the flexible channel;
- a rigid channel in fluid communication with the flexible channel, wherein an interface between the flexible channel and the rigid channel forms a smooth transition that causes the fluid to fully sweep the fluid flow path such that all inner aspects of the fluid flow path are contacted by the fluid at all times;
- a gel in contact with an outer surface of the flexible channel;
- a transducer in contact with the gel, wherein the transducer is configured to generate an output signal that corresponds to an amount of strain imparted on the flexible channel;
- a housing, wherein the flexible channel and transducer are arranged within the housing;
- a recess arranged in the housing;
- a retaining member for securing a rigid channel to the housing; and
- a gel arranged between the retaining member and the recess.

23. The sensor according to claim 22, wherein the retaining member comprises a ferrule.

* * * * *